United States Patent [19]

Kuroda et al.

[11] Patent Number: 5,165,797
[45] Date of Patent: Nov. 24, 1992

[54] THERMOCHROMIC COMPOSITE OXIDE AND METHOD FOR DETECTING TEMPERATURE THEREWITH

[75] Inventors: Masanori Kuroda; Michio Araki, both of Kure, Japan

[73] Assignee: Japan as represented by Director General of Agency of Industrial Science and Technology, Tokyo, Japan

[21] Appl. No.: 760,354

[22] Filed: Sep. 16, 1991

[51] Int. Cl.$^5$ .................. G01K 11/14; C09K 3/00; C09K 5/00
[52] U.S. Cl. .................. 374/162; 116/216; 252/962; 252/408.1
[58] Field of Search ............. 374/162; 252/962, 408.1; 116/216

[56] References Cited

U.S. PATENT DOCUMENTS

| | | | |
|---|---|---|---|
| 3,744,295 | 7/1973 | Allinikov | 374/5 |
| 3,816,335 | 6/1974 | Evans | 374/162 |
| 4,151,748 | 5/1979 | Baum | 116/207 |
| 4,646,674 | 3/1987 | Preziosi et al. | 374/162 |
| 4,717,710 | 1/1988 | Shimizu et al. | 116/207 |
| 4,788,151 | 11/1988 | Preziosi et al. | 116/207 |
| 4,942,119 | 7/1990 | Ozin et al. | 423/328 |

FOREIGN PATENT DOCUMENTS 0141033  5/1985  European Pat. Off. .......... 252/408.1
0159275 12/1981  Japan .................................. 252/408.1

OTHER PUBLICATIONS

Day, Jesse H., "Thermochromism of Inorganic Compounds," Chemical Reviews, pp. 649–657 (Nov. 25, 1968).

Primary Examiner—William A. Cuchlinski, Jr.
Assistant Examiner—Diego F. F. Gutierrez
Attorney, Agent, or Firm—Wenderoth, Lind & Ponack

[57] ABSTRACT

An inorganic thermochromic substance is proposed which is a composite oxide of strontium and manganese in a specified molar ratio as prepared by the calcination of a powder blend of strontium carbonate and manganese dioxide, instead of conventional manganese carbonate, at a specified temperature for a specified length of time. The temperature of the thermochromic color change is about −130° C., much lower than the color-change point of most of conventional thermochromic substances. The color of the composite oxide is grey or pale green at room temperature but reversibly changes to pale red when it is chilled to −130° C. or lower.

2 Claims, 2 Drawing Sheets

THERMOCHROMIC COMPOSITE OXIDE AND METHOD FOR DETECTING TEMPERATURE THEREWITH

BACKGROUND OF THE INVENTION

The present invention relates to a novel thermochromic composite oxide and a method for detecting temperature or temperature change of a body by using the same. More particularly, the invention relates to a composite oxide exhibiting thermochromic color change at a relatively low temperature and a method for detecting a change in the temperature of a body by using the composite oxide.

Since the temperature at which the color change of the inventive thermochromic composite oxide, referred to as the thermochromic point hereinbelow, takes place is low as compared with most of conventional thermochromic substances, the inventive thermochromic substance is useful as a thermochromic pigment for the purpose of visually detecting the temperature, for example, of a cryopreservation vessel chilled with liquid nitrogen for storage of oval cells used in the techniques of artificial insemination, temperature indication on and leakage detection from pipelines for transfer and reservoir vessels for storage of a liquid at an extremely low temperature such as liquid hydrogen and oxygen as a liquid propellant of rockets and so on in the form of a temperature-sensitive labels and paints. It is also useful for visual monitoring of the temperature distribution in a freezer machine for extremely low temperatures by utilizing the principle of the Joule-Thomson effect and as a thermochromic substance in image-converter devices for conversion of a heat-ray image to a visual image.

Thermochromic substances heretofore known in the art include liquid crystals and certain organic pigments. These thermochromic substances each have a thermochromic point specific to the respective substance exhibiting different colors in the temperature ranges below and above the thermochromic point so that they are widely used for visually detecting a change of temperature between the lower and higher temperature ranges. These conventional thermochromic substances have a problem in that most of them have a thermochromic point at room temperature or at an elevated temperature so that it is eagerly desired to develop a thermochromic substance having a thermochromic point at a low temperature. Moreover these conventional thermochromic substances are unstable at high temperatures as an inherency of organic substances.

SUMMARY OF THE INVENTION

The present invention accordingly has an object to provide a novel thermochromic substance having a thermochromic point at a cryologically low temperature and stable even by heating at a high temperature of 1000° C. or above without being decomposed as well as a method for detecting such a low temperature by using the thermochromic substance.

Thus, the thermochromic substance provided by the invention is a composite oxide of strontium and manganese in a molar ratio Sr:Mn of 3:1 to 1:3 in the form of a powder which is a product obtained by calcining a blend of powders of strontium carbonate and manganese dioxide in a specified molar proportion at a temperature in the range from 900° to 1200° C. for 15 minutes to 40 hours in air. The above mentioned strontium-manganese composite oxide of the invention is characterized by the thermochromism exhibited only when it is prepared from the above mentioned specific starting materials and under the above described specific conditions of calcination and distinguished from conventional strontium-manganese composite oxides expressed by the formula $SrMnO_3$.

This specific composite oxide of strontium and manganese exhibits a color of grey or pale green at a temperature higher than the thermochromic point and pale red at a temperature lower than the thermochromic point.

The method of the invention for the detection of temperature of a body accordingly comprises contacting the above defined specific composite oxide of strontium and manganese with the body and visually inspecting the color of the composite oxide which is grey or pale green at a temperature higher than the thermochromic point and pale red at a temperature lower than the thermochromic point.

DETAILED DESCRIPTION OF THE PREFERRED EMBODIMENTS

Figure 1:
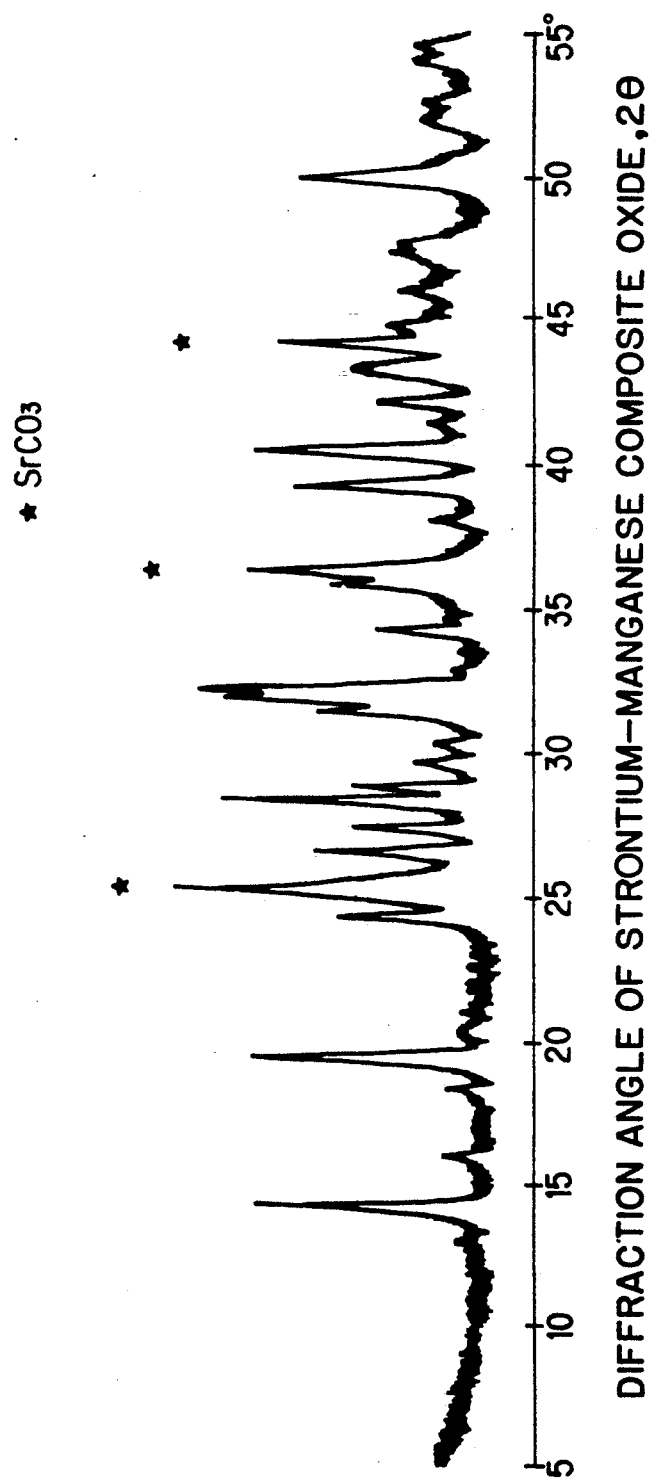
FIG. 1 is a powder X-ray diffractometric diagram of the strontium-manganese composite oxide prepared in Example from strontium carbonate and manganese dioxide in a molar ratio of 2:1.

As is described above, the thermochromic substance of the invention is a composite oxide of strontium and manganese having a specific thermochromic characteristic as prepared from specific starting materials in a specific procedure.

Needless to say, a composite oxide of strontium and manganese having a chemical formula of $SrMnO_3$ is old and X-ray crystallographic data are well analyzed for those prepared by the calcination of a powder blend of strontium carbonate and manganese carbonate. Contrary to the conventional procedure, it is essential in the present invention that the starting materials of the composite oxide are strontium carbonate and manganese dioxide. Quite unexpectedly, the composite oxide of strontium and manganese prepared by the calcination of a powder blend of strontium carbonate and manganese dioxide exhibits a remarkable thermochromisn at a relatively low thermochromic point even when the crystallographic structure thereof is analogous to that of the conventional composite oxide of $SrMnO_3$ with the molar ratio of Sr to Mn equal to 1:1 as prepared from strontium carbonate and manganese carbonate.

Namely, the inventor has conducted extensive investigations with an object to develop a novel inorganic thermochromic substance having a thermochromic point at a low temperature region and prepared various kinds of composite oxides by the calcination of a powder blend of the starting compounds of the respective constituent elements. When a composite oxide of strontium and manganese was prepared by the calcination of a powder blend of strontium carbonate and manganese dioxide, instead of conventional manganese carbonate, under specific conditions of calcination, it was unexpectedly discovered that the thus prepared composite oxide of strontium and manganese exhibited a thermochromism having a thermochromic point at a low temperature leading to completion of the present invention while no noticeable thermochromism could be found in the conventional composite oxide of SrMnO3 prepared from strontium carbonate and manganese carbonate and not reddish in color even at low temperatures.

Thus, the composite oxide of strontium and manganese of the invention is prepared by the method comprising the steps of: intimately blending powders of strontium carbonate and manganese dioxide in a molar ratio in the range from 3:1 to 1:3; and calcining the powder blend in air at a temperature in the range from 900° to 1200° C. for a length of time in the range from 15 minutes to 40 hours. When the temperature of calcination is too low or the length of time of the calcination is too short, the reaction of the starting materials can hardly proceed to completion leaving a large amount of strontium carbonate as undecomposed so that the resultant product cannot exhibit the desired thermochromism. When the calcination temperature is too high or the calcination time is too long, on the other hand, the composite oxide is imparted with a darkened color finally to turn into black so that adverse influences are caused in the sensitivity of the thermochromic color change of the composite oxide obtained. The calcination is usually complete within the above mentioned range of time though dependent on the temperature. This composite oxide is grey or pale green in color at room temperature depending on the molar ratio of strontium to manganese although no clear demarcation can be given for the molar proportion.

When the strontium-manganese composite oxide prepared in the above described manner is chilled and the temperature is gradually decreased the color of the composite oxide is changed at about −130° C. from grey or pale green to pale red. Namely, the high-temperature color of the composite oxide is grey when the molar ratio of strontium:manganese is 1:2 or smaller and pale green when the strontioum:manganese molar ratio is 1:1 or larger. The thermochromic point of −130° C. is definite at least by the visual inspection although this point is not very critical in the reflection spectra of the composite oxide taken at varied temperatures. The above mentioned thermochromic color change is reversible and never influenced by repeating the cycles of temperature decrease and temperature increase. Moreover, the thermochromism is not affected even by subjecting the composite oxide to a prolonged heat treatment at a high temperature of 1000° C. or higher. Further, the thermochromism of the inventive composite oxide is exhibited not only when the composite oxide is in a powder form but also when the composite oxide is used as a pigment in a coating composition or when the composite oxide is molded and sintered into the form of a ceramic plate so that the temperature of a body can be visually monitored by coating the body with a coating composition compounded with the inventive composite oxide as a pigment or attaching the sintered ceramic plate of the composite oxide to the body.

In the following, the invention is described in more detail by way of examples.

EXAMPLE

Strontium carbonate powder having an average particle diameter of 20 $\mu$m and manganese dioxide powder having an average particle diameter of 20 $\mu$m were taken in a molar proportion of 1:3, 1:2, 1:1, 2:1 and 3:1 and they were intimately mixed together. Each of the powder blends was put into a porcelain crucible and calcined in an electric furnace at 950° C. for 20 hours. After cooling, the calcined mass in the crucible was disintegrated into a fine powder which was subjected to the powder X-ray diffractometric measurement with the cu K$\alpha$ line to find complete disappearance of the manganese dioxide although some peaks assignable to strontium carbonate remaining unreacted could be found. FIG. 1 shows an X-ray diffraction diagram of the composite oxide prepared from 2:1 by moles blend of strontium carbonate and manganese dioxide.

A small amount of each of the composite oxide powders having a particle diameter of 30 $\mu$m or smaller was taken in a test tube which was dipped in liquid nitrogen so that the composite oxide was chilled to the temperature of liquid nitrogen to turn into pale red. In the course of temperature elevation by taking the test tube out of liquid nitrogen, the color of the composite oxide in the test tube was changed from pale red to grey and pale green when the molar ratio of starting strontium carbonate to manganese dioxide was 1:3 or 1:2 and 1:1, 2:1 or 3:1, respectively. The temperature of the composite oxide powder at which this color change occurred was determined by monitoring the output of a thermocouple with the junction point inserted into the powder in the test tube. The thus determined thermochromic point was −130° C. In each of the composite oxides.

Figure 2:
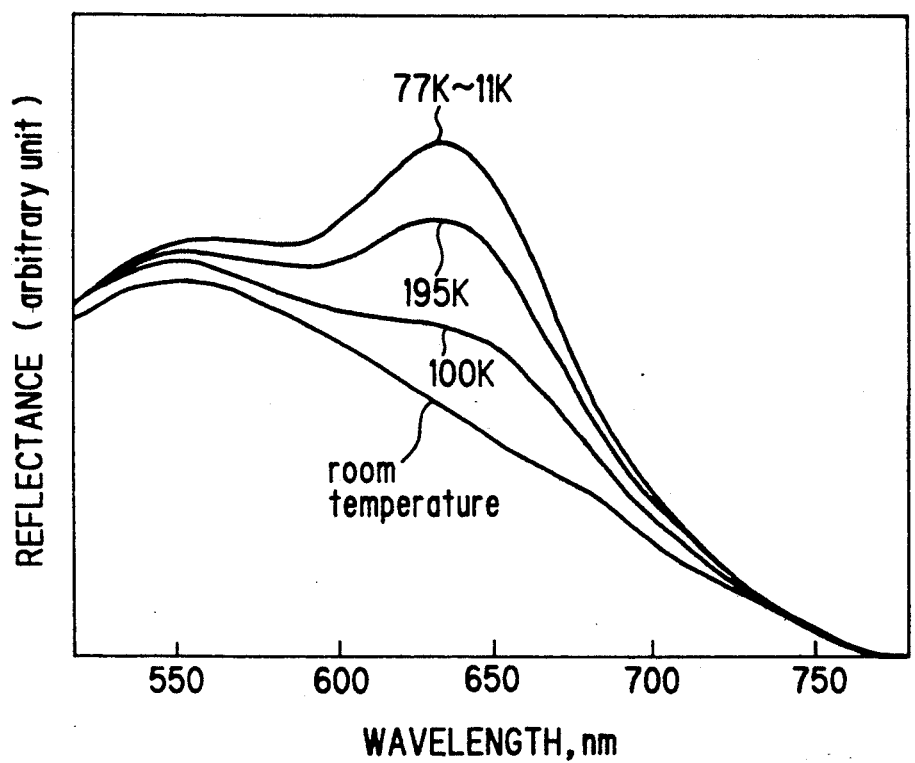
FIG. 2 shows the spectra of light reflection at varied temperatures of the inventive composite oxide of which the molar ratio Sr:Mn is 2:1 prepared in Example.

A reflection spectrum of the composite oxide was measured in the following manner at a temperature from room temperature to 11K in a wavelength range from 300 to 780 nm. Thus, a small amount of the composite oxide powder prepared from the 2:1 by moles blend of strontium carbonate and manganese dioxide was sandwiched between two plates of fused quartz glass and the thus prepared sample cell was mounted on the thermal head of a cryostat. The reflection intensity of monochromated light from the sample in the above mentioned wavelength range was measured at varied temperatures by using a photomultiplier. The results are shown in FIG. 2 for the respective temperatures giving the reflectance in arbitrary units as a function of the wavelength, from which it is clear that the reflectance is remarkably increased in the wavelength range of from 620 to 640 nm when the temperature was decreased from room temperature to 11K.

In order to determine the conditions of calcination for obtaining the thermochromic composite oxide, a 2:1 by moles blend of strontium carbonate and manganese dioxide was calcined at various temperatures for varied lengths of time and the product obtained by calcination was tested for the thermochromism. The results were as shown below.

| Calcination | Thermochromism |
|---|---|
| for 15 minutes at 800° C. | no |
| for 15 minutes at 900° C. | yes |
| for 20 minutes at 900° C. | yes |
| for 30 hours at 900° C. | yes |
| for 40 hours at 900° C. | yes, but somewhat blackened |
| for 30 minutes at 1100° C. | yes |
| for 30 minutes at 1200° C. | yes |
| for 30 minutes at 1300° C. | no |

What is claimed is:

1. A composite oxide of strontium and manganese in a molar ratio of Sr:Mn in the range from 1:3 to 3:1 exhibiting thermochromism, which is a product obtained by calcination of a powder blend of strontium carbonate and manganese dioxide in air at a temperature in the range from 900° to 1200° C. for a length of time from 15 minutes to 40 hours.

2. A method for detecting a temperature change of a body over the range of from above to below about −130° C. which comprises visually inspecting the color of a thermochromic substance in contact with the body, wherein said thermochromic substance changes color at about −130° C., the thermochromic substance being a composite oxide of strontium and manganese in a molar ratio of Sr:Mn in the range from 1:3 to 3:1 exhibiting thermochromism, which is a product obtained by calcining a powder blend of strontium carbonate and manganese dioxide in air at a temperature in the range from 900° to 1200° C. for a length of time from 15 minutes to 40 hours.

* * * * *